United States Patent [19]

Kosinski et al.

[11] Patent Number: 4,504,297

[45] Date of Patent: Mar. 12, 1985

[54] OPTICAL FIBER PREFORM MANUFACTURING METHOD

[75] Inventors: Sandra G. Kosinski, New Providence; Paul J. Lemaire, Basking Ridge; Paul B. O'Connor, Middlesex, all of N.J.

[73] Assignee: AT&T Bell Laboratories, Murray Hill, N.J.

[21] Appl. No.: 511,142

[22] Filed: Jul. 6, 1983

[51] Int. Cl.³ .............................................. C03C 25/02
[52] U.S. Cl. .................................... 65/3.11; 65/2; 65/3.12; 65/13; 65/32; 427/163
[58] Field of Search ....................... 65/3.12, 2, 3.2, 13, 65/32, 3.11; 427/163

[56] References Cited

U.S. PATENT DOCUMENTS 3,791,714  2/1974  Maurer ................................. 350/96
4,389,230  6/1983  Modone et al. ..................... 65/3.12

FOREIGN PATENT DOCUMENTS 811044585  6/1981  European Pat. Off. .
3104041  8/1982  Fed. Rep. of Germany ............ 65/2

OTHER PUBLICATIONS

CSELT Rapporti tecnici, vol. IX, No. 6, Dec. 1981, Modone et al., pp. 621–623.
Ser. No. 469,830, Burrus–Stone, CIP of Ser. No. 369,605 filed 4/19/82, which was cont. of Ser. No. 194,882, filed Oct. 7, 1980.
J. Stone and C. A. Burrus, *The Bell System Technical Journal*, vol. 59, No. 8, Oct. 1980, pp. 1541–1548.
E. Modone and G. Roba, *Electronics Letters*, vol. 17, No. 21, pp. 815–817, (1981).
J. Stone and P. J. Lemaire, *Electronics Letters*, vol. 18, No. 2, pp. 78–80, (1982).
S. R. Nagel et al., *IEEE Journal of Quantum Electronics*, vol. QE-18, No. 4, Apr. 1982, pp. 459–476.
J. E. Shelby, *Journal of Applied Physics*, vol. 48, No. 8, Aug. 1977, pp. 3387–3394.
J. Stone and P. J. Lemaire, CLEO 1981, *Conference on Lasers and Electro–Optics*, Jun. 1981, Washington, D.C.
J. Stone and P. J. Lemaire, *Electronics Letters*, vol. 18, No. 4, 1982, pp. 185–186.
E. Modone and G. Roba, *Electronics Letters*, vol. 18, No. 4, 1982, p. 186.

*Primary Examiner*—Robert Lindsay
*Attorney, Agent, or Firm*—Eugen E. Packer

[57] ABSTRACT

The time required to collapse an OH-rich silica tube can be reduced significantly by subjecting the tube to a deuterium/hydrogen exchange prior to its collapse.

9 Claims, No Drawings

OPTICAL FIBER PREFORM MANUFACTURING METHOD

FIELD OF THE INVENTION

This application pertains to optical fiber manufacturing methods.

BACKGROUND OF THE INVENTION

Glass optical fiber is typically produced by drawing from a solid glass rod, to be termed herein the "preform". In some widely practiced preform manufacturing processes (e.g., the Modified Chemical Vapor Deposition (MCVD) process), the preform is produced by collapsing a tubular body consisting of a silica substrate tube and, deposited thereon, high-purity glass formed from precursor material in a glass-forming reaction. Furthermore, in a version of the Vapor Axial Deposition (VAD) process, a silica tube, the "sleeve" tube, is collapsed around a core consisting of deposited glass material. Thus, collapsing a silica tube to a smaller diameter, including to solid rod form, is a common optical fiber manufacturing step.

Although materials other than silica are potentially useful for optical fibers, at least for communication purposes the fibers of choice currently are high-silica fibers. However, the refractory nature of silica leads to some production difficulties. For instance, the above referred-to collapse typically has to be carried out at very high temperatures (typically in excess of 2,000° C., typically obtained by means of one (or more) reciprocating oxy-hydrogen torches), and typically requires considerable time, of the order of hours. Since preform fabrication costs constitute a significant part of the cost of optical fiber production, and since, furthermore, the time required for producing a preform is a very significant component of preform fabrication cost, process changes that result in decreased collapse time would be of obvious economic significance. This application discloses such a change that results in substantial decrease of collapse time without, at the same time, having a deleterious effect on fiber properties, and which can be implemented easily and at very low cost.

Since the instant invention comprises deuteration of silica tubes, brief reference will now be made to prior art uses of deuterium in optical fiber manufacture.

U.S. Pat. No. 3,791,714, issued Feb. 12, 1974 to R. D. Maurer, for "Method of Producing Glass for Optical Waveguides," discloses that glass having low hydroxyl ion content can be produced by means of flame hydrolysis, the process comprising passing deuterium gas, or a deuterium compound gas, through a liquid containing a silicon compound such as silicon tetrachloride, and burning the resulting vapor to deposite a film comprising silicon deuteride on a rotating mandrel.

J. Stone and C. A. Burrus, *Bell System Technical Journal*, Vol. 59(8), pages 1541–1548 (1980), disclose that deuterium/hydrogen exchange in silica-based glass can be used to produce low loss optical fibers by decreasing OH-loss. A similar approach was disclosed by E. Modone and G. Roba, *Electronics Letters*, Vol. 17(21), pages 815–817 (1981). See also European patent application No. EP81 10 4458, filed June 11, 1981, by E. Modone et al, for "Process for Reducing the Hydroxyl-Group Content in Preforms for Optical Fibers Manufactured by MCVD Process".

SUMMARY OF THE INVENTION

The inventive improved optical fiber manufacturing process comprises collapsing at least a part of a tubular body comprising silica to a smaller diameter (including collapse to solid rod form) and drawing optical fiber from the collapsed glass body, the "preform", the tubular body comprising silica tube material of initial OH-content of at least about 25 ppmw, at least some of the silica tube material having been subjected to a deuterium/hydrogen exchange step prior to collapse, whereby the total OH-content of the silica tube material is reduced substantially, preferably by at least about 50% or at least about 100 ppmw, whichever reduction is less, in at least the part of the tubular body that is to be collapsed, and the collapse time is reduced substantially, typically by at least about 10%.

The inventive process can be applied in any fiber manufacturing process comprising silica tube collapse. In particular, it can be applied advantageously in the manufacture of single mode fiber, including "depressed index" cladding single mode fiber. Such fibers typically have such thick deposited cladding (resulting in, typically, a deposited-cladding-to-core ratio D/d of about 4–12) as to make negligible any loss due to OH-diffusion from the substrate or sleeve tube material.

DETAILED DESCRIPTION

Silica tubes of the type currently used in optical fiber preform manufacture can contain a substantial amount of OH. For instance, some commercially available silica tubing, formed by the fusion of natural quartz, contains about 100–200 ppmw (parts per million weight) of OH, and some synthetic silica tubing, used because it tends to result in particularly high-strength fiber, can contain 1000 ppmw and more of OH. We have found that the time required to collapse such "wet" substrate tubes can be reduced substantially, typically by at least about 10%, by deuteration of the tube. In general, we believe that a significant collapse time reduction can be achieved by deuteration of silica (substrate or sleeve) tubes containing more than about 25 ppmw of OH, provided that the deuteration results in a substantial reduction of the total OH-content of at least the part of the tube that is to be collapsed, preferably a reduction of the total OH-content of the part by at least about 50%, or by at least about 100 ppmw, whichever reduction is less.

Deuteration can be carried out by any convenient process, but is perhaps most simply carried out by maintaining the silica tube (or the relevant part thereof) at an elevated temperature in a deuterium-comprising atmosphere, such that both inner and outer tube surfaces are exposed to the deuterium. Appropriate heat treating times and temperatures can be determined from data available in the literature. See, for instance, J. E. Shelby, *Journal of Applied Physics*, Vol. 48(8), pages 3387–3394 (1977). Although some deuterium/hydrogen exchange in silica takes place at temperatures as low as 150° C., for practical reasons it is generally advantageous to carry out the in-diffusion and exchange at higher temperatures, typically above about 500° C. The atmosphere can be either substantially $D_2$ or comprise also inert diluents, e.g., $N_2$ or Ar.

The time required for substantially complete deuterium/hydrogen (D/H) exchange throughout a volume of silica depends substantially exponentially on the temperature, at least approximately on the square of the diffusion distance, and is also approximately proportional to the initial OH-concentration. For a diffusion path length typical for D/H exchnage in silica tubing according to the invention, the time will be at least about 30 minutes, and typically substantially longer than that. Those skilled in the art will be readily able to estimate required heat treating times from data available in the literature.

The required time depends also, at least to some extent, on the concentration of deuterium in contact with the silica tubing. However, a deuterium partial pressure of at least about 10 Torr can produce deuterium in-diffusion at appropriate temperatures.

By way of example, we have treated a fused silica substrate tube, of 46 mm inner diameter (ID), and 50 mm outer diameter (OD), at 900° C. in one atmosphere of deuterium gas for 60 hours. The material contained about 165 ppmw of OH prior to deuteration, as determined by optical spectroscopy. Following the above heat treatment, the spectroscopic measurement indicated the presence of approximately 265 ppmw of OD, with substantially no OH absorption detectable, indicating essentially complete D/H exchange through the volume of the tube, with the possible incorporation of some excess deuterium into the silica. It should be noted that a considerably shorter heat treating time, e.g., 30 hours, would still produce nearly complete D/H exchange under the above conditions.

We have found that a deuterated tube according to the invention can be collapsed in a significantly shorter, typically at least about 10% shorter, time than a similar, but "wet" tube. For instance, a fused silica tube of the described type and deuterated as described above, was used as a substrate to deposite thereon material for a standard single-mode lightguide and then collapsed by a standard technique, substantially as described in S. R. Nagel et al, IEEE Journal of Quantum Electronics, Vol. QE-18 No. 4, pp. 459–476 (1982). It was found that the diameter of the tubular body comprising the deuterated tube material could be reduced in larger steps, at higher torch traverse rates, with smaller flows of hydrogen to the torch, than is possible with undeuterated material. These factors combined resulted in an overall decrease in collapse time by about 30%.

Deuteration typically also results in a reduced radial temperature gradient in treated silica tubes during their collapse, allowing collapse to proceed at lower surface temperatures, thus resulting in less ablation of the material by the torch flame.

A possible explanation for the advantageous effects of deuterium/hydrogen exchange on silica tube collapse is the following. The temperature of the hot zone during collapse (as well as at all other times) is determined by the balance between heat input to, and heat losses from, the zone. Heat is introduced primarily by conduction and convection from appropriate heating means, typically an oxy-hydrogen torch flame. At the temperatures of interest here, heat from the zone is lost primarily by radiation. "Dry" silica, i.e., substantially OH-free silica, has low emittance over the wavelength range from about 0.3 to about 3.5 $\mu$m, the wavelength range at which an ideal black body at the collapse temperature (e.g., 2300° C.), would emit strongly. Thus, OH-free silica cannot readily lose heat by radiation in this wavelength range and is relatively easy to heat to collapse temperatures. On the other hand, wet silica, i.e., silica containing a significant amount of OH, has a strongly absorbing, and therefore emitting, band near 2.72 $\mu$m, resulting in significant heat loss by radiation, therefore requiring higher torch gas flows to achieve collapse temperatures. Exchanging OH with OD results in a shift of the absorption band to 3.71 $\mu$m. At this wavelength, the radiation heat losses from the hot zone are lower since now the absorption band is further from the peak of the collapse temperature black body spectrum, and thus does not contribute strongly to the emittance of the hot zone material. For instance, the peak of the 2300° C. black body spectrum is at 1.13 $\mu$m. In addition to the above-indicated mechanism, the facts that the OD vibration is weaker than its OH analog by a factor of about 0.57, and occurs near the Si-O vibration edge, may advantageously affect the heat balance of the hot zone.

The above remarks are solely intended as a possible aid to the understanding of the invention, and the scope of the invention is not intended to depend on the nature of the mechanism responsible for the reduction in collapse time. Furtheremore, the scope of the invention is not limited to a method for producing optical fiber from a preform produced by MCVD, but is intended to encompass all processes for producing an optical fiber preform that entail a silica tube diameter reducing step, including complete collapse as well as partial collapse.

What is claimed is:

1. Method for manufacturing an optical fiber, the fiber having an operating wavelength and a loss at the operating wavelength, a core of diameter d, a first clad of outer diameter D surrounding the core, and a second clad surrounding the first clad, the material of the second clad derived from a pre-existing tube consisting substantially of silica having an initial OH-content greater than about 25 ppmw, the material of the core and the material of the first clad formed by means of a glass-forming reaction, the method for manufacturing the optical fiber comprising drawing the fiber from a glass body, to be termed a preform, the preform having been produced by a process comprising collapsing at least a part of a tubular body comprising the pre-existing tube, the preform being configured such that the fiber drawn therefrom has, at the operating wavelength, a substantially negligible loss due to OH diffused from the material of the pre-existing tube into the material formed by means of the glass-forming reaction, the method characterized in that
    at least some of the material of the pre-existing tube is subjected, prior to collapse of the tubular body, to a deuterium/hydrogen exchange treatment, such that the OH-content of the material of the part of the pre-existing tube is reduced from the initial OH-content by at least about 50% or 100 ppmw, whichever is less.

2. Method of claim 1, wherein the tubular body further comprises some reaction product of the glass-forming reaction, the reaction product having been deposited onto the interior surface of the pre-existing tube, the pre-existing tube to be referred to as the substrate tube, and the deuterium/hydrogen exchange treatment comprises maintaining, prior to deposition of the reaction product onto the substrate tube, at least part of the substrate tube at a temperature of at least 150° C. in an atmosphere having a deuterium partial pressure of at least about 10 Torr.

3. Method of claim 1, wherein the pre-existing tube, to be termed the sleeve tube, is collapsed around a preformed glass body consisting substantially of reaction product of the glass-forming reaction, and the deuterium/hydrogen exchange treatment comprises maintaining at least part of the sleeve tube at a temperature of at least 150° C. in an atmosphere having a deuterium partial pressure of at least about 10 Torr.

4. Method of claim 1, wherein the deuterium/hydrogen exchange treatment comprises maintaining at least part of the pre-existing tube at a temperature of at least about 500° C. for at least about 30 minutes in an atmosphere having a deuterium partial pressure of at least about 10 Torr.

5. Method of claim 4, wherein the deuterium/hydrogen exchange step results in substantially complete removal of OH from the pre-existing tube.

6. Method of claim 5, wherein the deuterium/hydrogen exchange treatment results in an OD concentration in the material of the pre-existing tube that is greater than the initial OH concentration in the material.

7. Method of claim 1, wherein the optical fiber is a single mode fiber.

8. Method of claim 7, wherein the fiber if a depressed index cladding fiber.

9. Method of claim 1, wherein the optical fiber has a ratio D/d greater than about 4.

* * * * *